Sept. 1, 1959   G. G. MILES ET AL   2,902,151
AUTOMATIC INSPECTION APPARATUS FOR GLASS CONTAINERS AND THE LIKE
Filed Sept. 21, 1955   4 Sheets-Sheet 3

INVENTORS:
George G. Miles &
John McMackin.
BY: Beau, Brooks, Buckley & Beau,
ATTORNEYS.

Sept. 1, 1959  G. G. MILES ET AL  2,902,151
AUTOMATIC INSPECTION APPARATUS FOR GLASS CONTAINERS AND THE LIKE
Filed Sept. 21, 1955  4 Sheets-Sheet 4
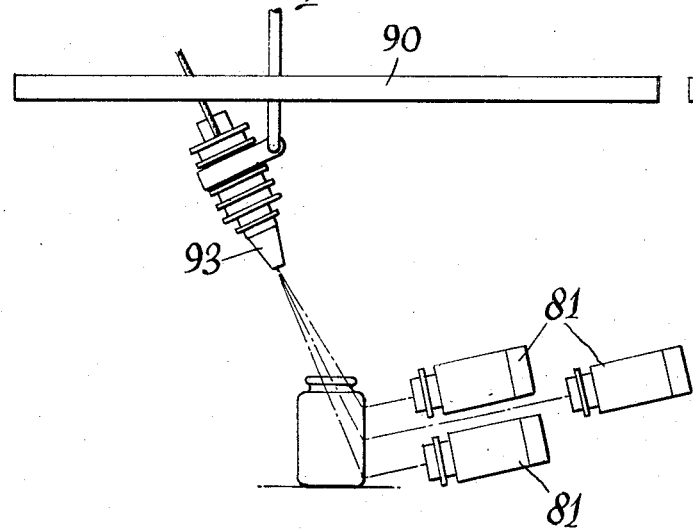
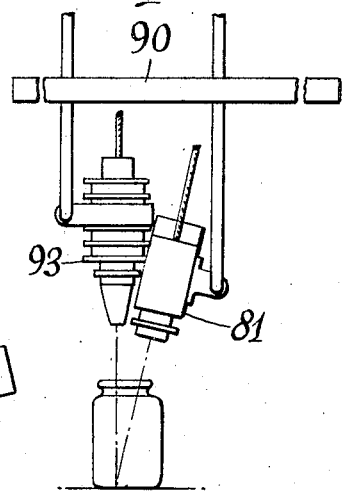
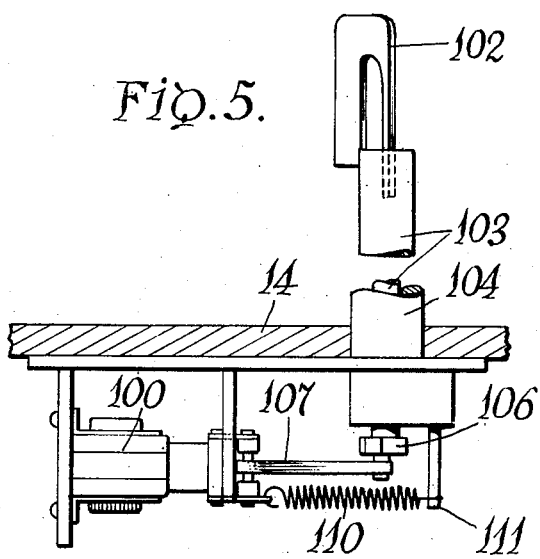
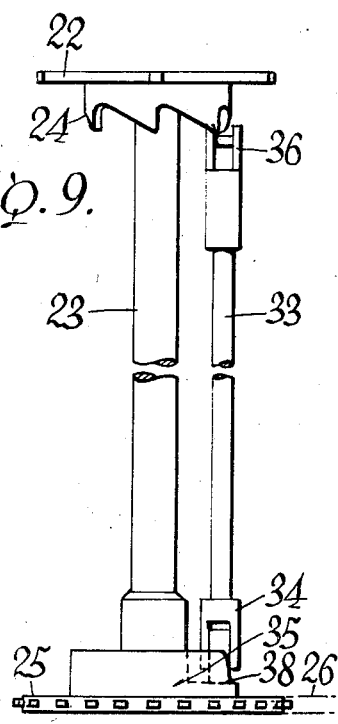
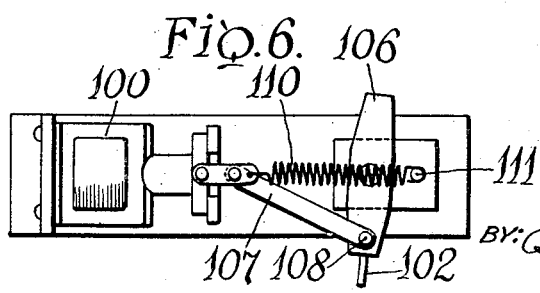
INVENTORS:
George G. Miles &
John McMackin,
BY: Beau, Brooks, Buckley & Beau,
ATTORNEYS.

United States Patent Office 2,902,151
Patented Sept. 1, 1959

2,902,151

AUTOMATIC INSPECTION APPARATUS FOR GLASS CONTAINERS AND THE LIKE

George G. Miles and John McMackin, Brockway, Pa., assignors to Brockway Glass Company, Inc., Brockway, Pa.

Application September 21, 1955, Serial No. 535,596

2 Claims. (Cl. 209—111)

This invention relates to novel apparatus for the automatic inspection of articles of glassware, particularly mass produced glass articles such as containers.

Glass containers are usualy visually inspected or at least spot checked for such defects as splits, checks, cracks, blisters, spikes, jaggers or other surface fractures. This inspection is laborious and time consuming and subject to the usual percentage of error encountered whenever purely visual or empirical inspection methods are relied upon, and more especially when merely random or spot checking is performed. The present invention provides an optical inspection method and apparatus which is entirely automatic, both in the performance of the actual optical inspection step and in the incidental rejection of containers or similar articles which exhibit optically determinable defects of various kinds.

According to the present invention, glass containers or similar articles moving along a conveyer are guided to a predetermined inspection zone where articles are successively rotated on their own vertical axes for predetermined time periods during which a light sensitive instrument or component of the apparatus is directed against a predetermined point or area on each article, which point or area is in effect a circular or orbital zone or belt about the article due to the aforesaid rotation thereof. The time period of rotation and inspection will ordinarily be merely sufficient to insure a complete rotation of the article while the inspection means is fully operative.

Changes in light reflectance and consequent variations in light impingement on the light sensitive component influences the light sensitive component electrically in a manner well known in the electrical art and this varying influence is of marked degree when the glass article exhibits any of the foregoing defects.

Means are provided whereby, upon abnormal excitation of the light sensitive component, a mechanical deflector operates to remove from the conveying line the article which has caused such abnormal excitation by reason of an optically determinable defect in the article.

The following specification and the accompanying drawings disclose a representative embodiment of the principles of the present invention but it is to be understood that practical application of those principles admit of considerable variation in mechanical and electrical detail and that the illustrated embodiment is set forth by way of example only, the scope of the invention being limited only as defined in the appended claims.

In the drawings:

Fig. 5 is a fragmentary cross-sectional view taken approximately on the line V—V of Fig. 3;

Fig. 6 is a bottom plan view of the portion of the apparatus illustrated in Fig. 5;

Fig. 7 is a somewhat schematic elevational view of the optical components of the inspection mechanism showing a variant arrangement thereof for performing inspection of side wall areas or portions of glass containers or similar articles;

Fig. 8 is a view similar to Fig. 7 but with the optical components arranged to perform inspection of the bottom wall of glass containers or similar articles; and Fig. 9 is a fragmentary elevational view of the star wheel arrangement for feeding containers to the inspection means proper, viewed as in Fig. 1 but on a larger scale.

Figure 1:
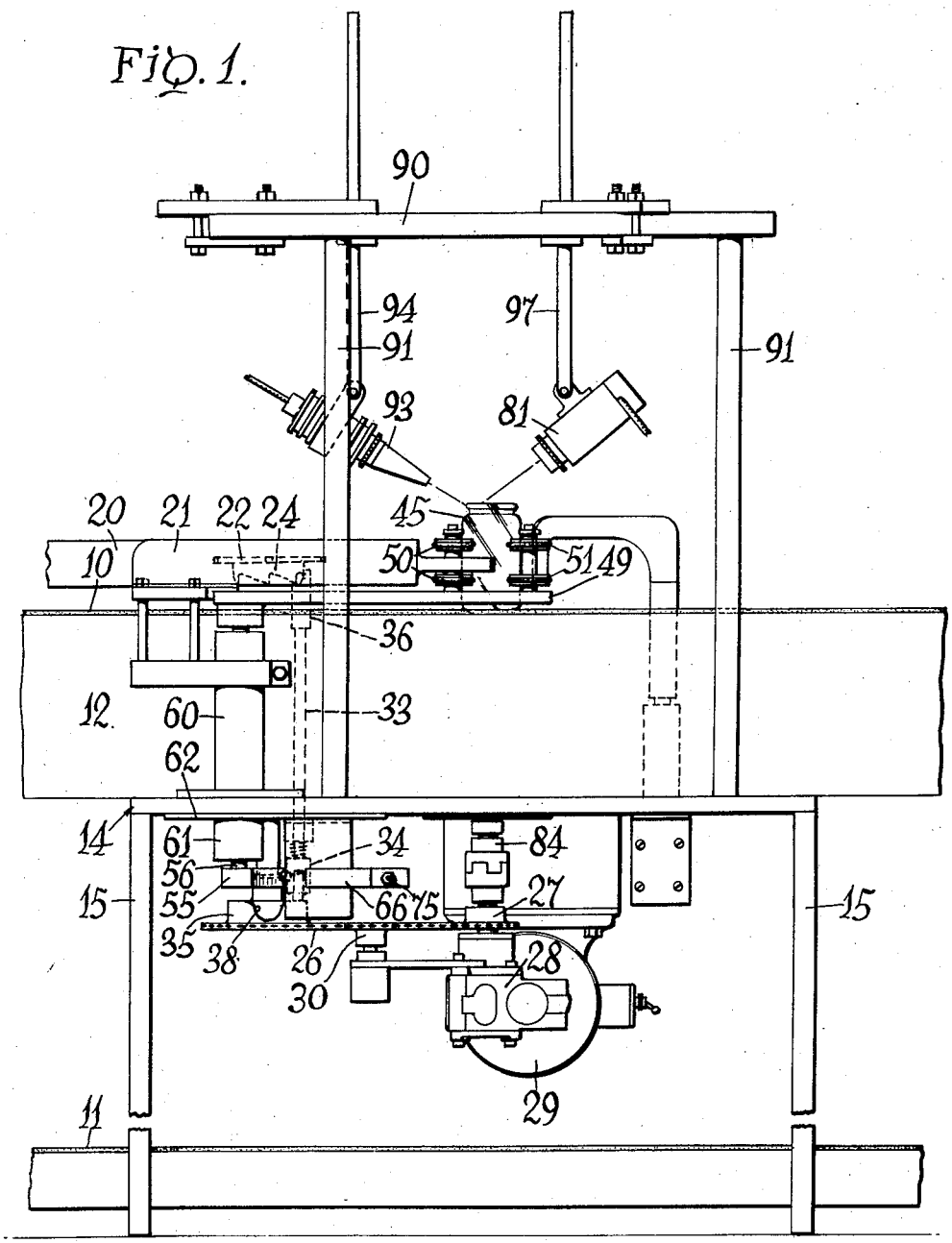
Fig. 1 is a general side elevational view of one form of the apparatus of the present invention shown in conjunction with a conveyor belt along which articles of glassware are carried, as for instance from the fabricating machines and annealing lehrs.
Figure 2:
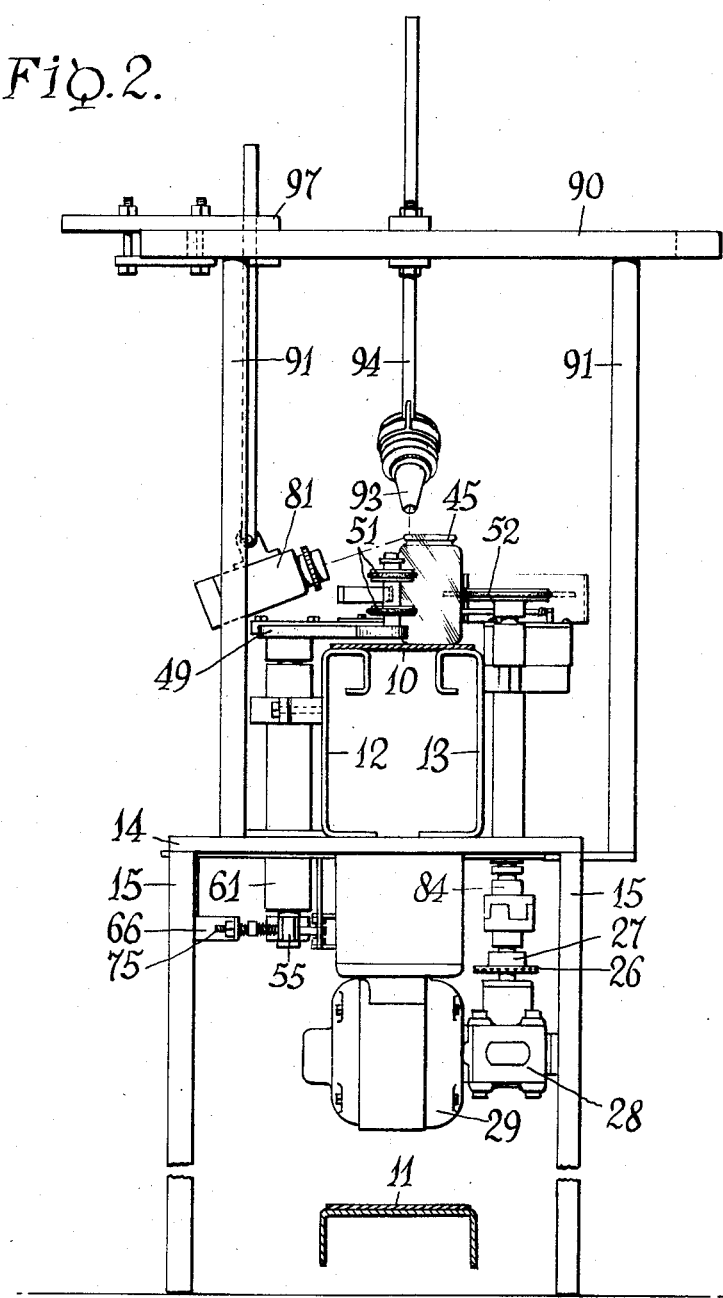
Fig. 2 is an end elevational view of the apparatus of Fig. 1 viewed from the right-hand or delivery end of Fig. 1.
Figure 3:
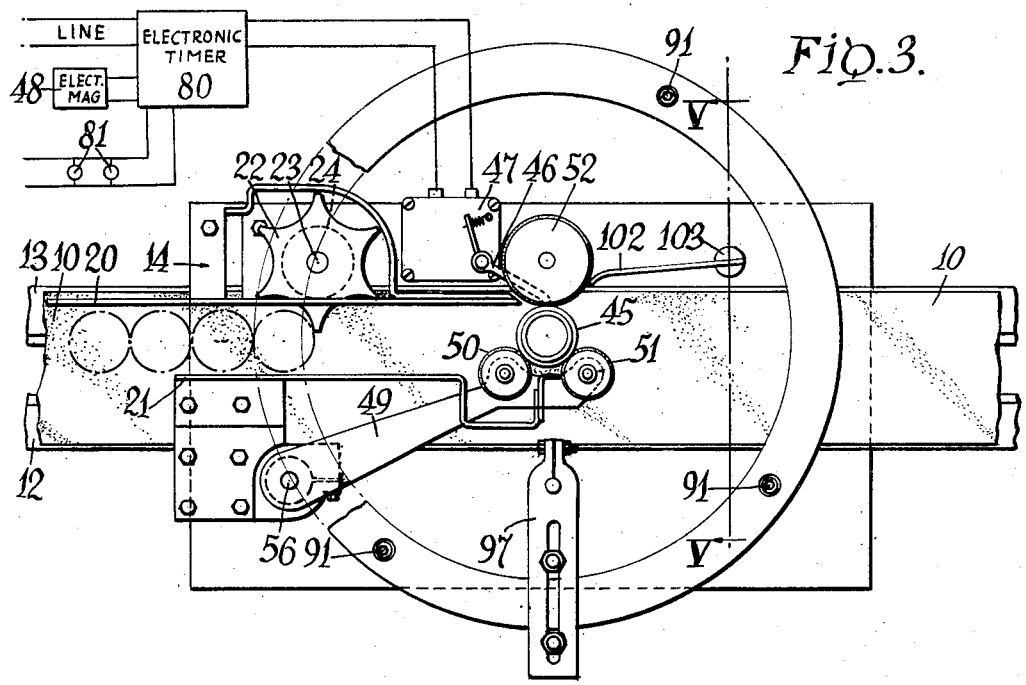
Fig. 3 is a top plan view of the apparatus of Figs. 1 and 2.

Referring particularly to Figs. 1, 2 and 3 the numeral 10 designates the upper or working portion or extent of a conveyor belt while the numeral 11 designates a lower return portion of such belt. The upper portion, in the illustrated instance, is supported by a pair of longitudinal structural members 12 and 13 and a table member 14 underlies the structural members 12 and 13 to give incidental support thereto, the table member 14 serving primarily as a support for the inspection apparatus of the present invention. Table member 14 is supported by legs 15.

A series of glass containers is carried along by belt 10 in a loosely aligned row which need not be of uniform spacing. Various aligning and orienting arrangements may be employed, as is well known in this art. The containers pass between a pair of vertical guide plates 20 and 21 and each container is momentarily arrested by coming into engagement with one of the projections of a star wheel 22, as shown in Fig. 3.

Referring particularly to Figs. 1 and 9, star wheel 22 is mounted for free rotation on a vertical shaft 23 and has fixed to its underside a downwardly facing ratchet 24. A sprocket 25 is fixed to the lower end of vertical shaft 23 and is connected by a driving chain 26 with a sprocket 27 which is fixed to the output shaft of a conventional speed reducing gear 28 which is driven by an electric motor 29. An adjustable tensioning idler is indicated at 30 in Fig. 1.

A vertical push rod 33 has a cam follower 34 at its lower end and the hub of sprocket 25 provides a face cam 35 with which follower 34 engages. The upper end of push rod 33 is provided with a ratchet pawl 36 which engages the teeth of ratchet 24 and normally prevents rotation of star wheel 22.

Face cam 35 includes a depression 38 and, as sprocket 35 rotates in timed relation with respect to the inspection mechanism generally, push rod 33 periodically lowers as follower 34 comes into registration with depression 38 to momentarily release star wheel 22 for rotation by lowering movement of ratchet pawl 36 from ratchet 24.

The friction between the containers and the surface of belt 10 is of but moderate degree so that when star wheel 22 is held against rotation, the belt merely slides beneath the arrested container or containers. Upon momentary release of the star wheel 22 for free rotation a container bearing thereagainst continues its movement along with belt 10 for movement into the inspection zone. The release of star wheel 22 is merely momentary so that star wheel 22 is again arrested by the ratchet mechanism to arrest the immediately following container until the next cyclic release of star wheel 22.

Referring particularly to Fig. 3, the numeral 45 indicates a container in the ultimate position of inspection. As the container reaches this position it engages a switch arm 46 which operates a micro switch 47 which energizes an electromagnet 48. Energization of electromagnet 48 causes an arm 49 to swing in a counterclockwise direction as viewed in Fig. 3 and spaced pairs of rollers 50 and 51 carried by arm 49 swing against container 45 and confine the same between rollers 50 and 51 and a constantly rotating wheel 52. The wheels 50, 51 and 52 are preferably resiliently treaded as by rubber bands or the like to avoid marking or damaging the glass containers.

Figure 4:
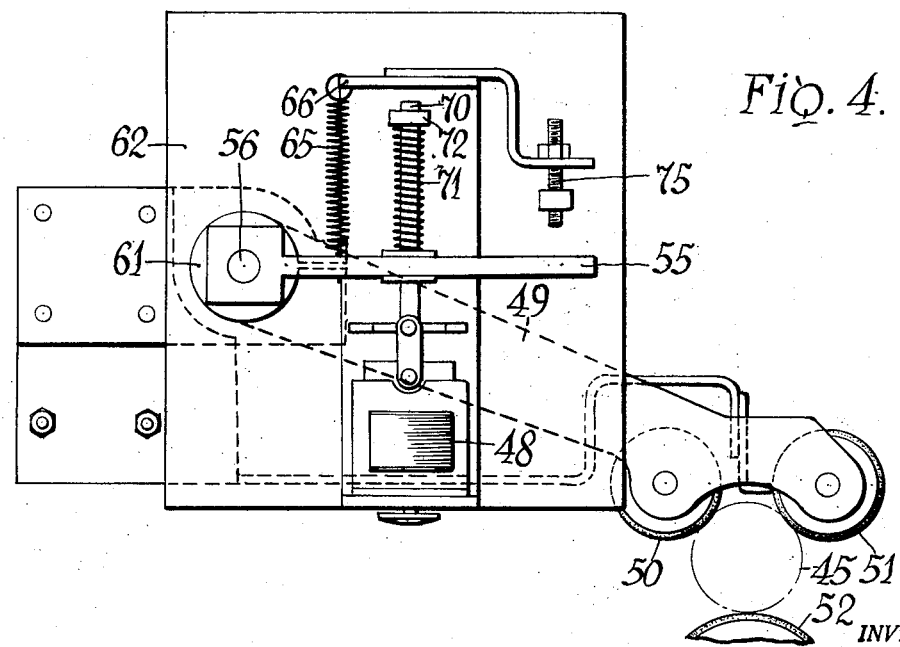
Fig. 4 is a bottom plan view of a portion of the apparatus of Figs. 1 through 3 on a slightly enlarged scale.

The mechanism for producing this swinging movement of arm 49 is shown in detail in the fragmentary bottom plan view, Fig. 4, to which reference will now be had. An arm 55 is fixed to the bottom of a rock shaft 56 to the upper end of which arm 49 is fixed. Shaft 56 is journalled for free rotation in bearings 60 and 61 which are supported by a plate 62 attached to table 14. An extension coil spring 65 engages arm 55 and is anchored at its other end to a bracket 66 attached to the bottom of plate 62 and urges arm 55 in a counterclockwise direction as viewed in Fig. 4 or a clockwise direction as viewed in Fig. 3, thus normally resiliently biasing arm 49 to a position where the wheels 50 and 51 are out of engagement with a container at the inspection zone.

The armature of electromagnet 48 is connected by conventional linkage with a pull rod 70 and a compression coil spring 71 seats at one end against arm 55 and at its other end against a collar 72 fixed to pull rod 70. Upon energization of electromagnet 48 pull rod 70 urges arm 55 in a clockwise direction as viewed in Fig. 4 through the resilient intervention of a spring 71, thus swinging arm 49 to bring the rollers 50 and 51 to the previously described container engaging and retaining position illustrated in Fig. 3. A screw threaded adjustable stop 75 is engaged by the outer end of arm 55 in the withdrawn inoperative position to arrest the same against the urge of spring 65.

Operation of micro switch 47 to energize electromagnet 48 is through an electronic timer unit 80 shown schematically in Fig. 3 and output leads from electronic timer 80 likewise activate photocells 81 of any desired number. The electronic timer is a commercial unit the details of which form no part of the present invention. Appropriate adjustments of the timer are made so that closure of micro switch 47 immediately energizes electromagnet 48 and maintains such energization for a predetermined time period according to adjustment of the electronic timer.

Similarly, closure of micro switch 47 sets up an impulse in the electronic timer which results in a delayed activation of photocells 81 and maintains activation for a likewise predetermined period which falls within the period of energization of electromagnet 48. That is, photocells 81 are activated only after arm 49 has acted to confine a container as illustrated in Fig. 3 and are deactivated before the end of the constrained, article-rotating period, to prevent false impulses upon movements of containers to and away from the inspection station.

As indicated previously herein, wheel 52 rotates constantly by virtue of connection with the output shaft of speed reducer 28, as indicated at 84 in Fig. 1, and therefore as soon as arm 49 brings a container to the position illustrated at 45 in Fig. 3, the container is rotated upon its own vertical axis by engagement with rotating wheels 52, the wheels 50 and 51 being mounted for free idle rotation in the presently described embodiment.

In the form of the invention illustrated herein by way of example the optical inspection implements are mounted upon or suspended from a ring 90 which if fixedly mounted above the foregoing apparatus upon a plurality of posts 91 extend upwardly from table 14. Referring to Fig. 1, the numeral 93 designates a light source which directs a concentrated beam of light against a predetermined portion of container 45, in Fig. 1 such portion being the upper portion of the finish of the container 45. Light source 93 is adjustably suspended from ring 90 by bracket means 94 whereby the light source may be variously positioned and directed.

In Fig. 1 the numeral 81 designates a viewing photocell unit of conventional construction which is suspended from ring 90 by bracket means 97, likewise in such manner as to be variously positioned and directed. The light sensitive photocell viewing component 81 of Fig. 1 corresponds to the viewing device 81 shown schematically in wiring diagram portion of Fig. 3 and is freely available commercially as a complete unit. In Fig. 1 photocell unit 81 is aimed at the point on the container which is illuminated by light source 93. Photocell actuated relays are well known in the electrical arts and are purchased as complete units and no further description or illustration is believed to be necessary or desirable.

As the container 45 is rotated by wheels 52 the light source and phototube units scan a given area extending entirely about the container. If the container is perfect within commercial limits or up to acceptable standards along the scanned area the container is released after the time cycle of electromagnet 48 terminates and passes along with belt 10. If a crack, check or other abnormality is present in the scanned area it results in a substantial change in reflectivity and the resultant substantial change in illumination of photocell 81 energizes an electromagnet 100 which operates rejection mechanism illustrated in detail in Figs. 5 and 6, reference to which will now be had.

A deflecting member or paddle 102 is fixed to the upper end of a vertical rock shaft 103 and is normally positioned out of the path of movement of the containers 45, as shown in Fig. 3. Shaft 103 is journalled for free rotation in a bearing 104 supported by table 14 and the lower end of rock shaft 103 has fixed thereto an arm 106.

Referring particularly to Fig. 6, the armature of electromagnet 100 connects to one end of a link 107 whose opposite end is pivotally connected to arm 106 as at 108. An extension coil spring 110 is fixedly anchored as at 111 at one end and connects at its other end with the armature and linkage mechanism to urge the armature to the right as viewed in Fig. 6 and accordingly urge arm 106, rock shaft 103 and paddle 102 in a counterclockwise direction as viewed in Fig. 6, the bottom plan view, and in a clockwise direction as viewed in Fig. 3.

Energization of electromagnet 100 by the presence of an optically determinable defect in a container in the inspection zone causes the electromagnet, through link 107, to rotate arm 106, rock shaft 103 and deflecting member 102 in a clockwise direction as viewed in Fig. 6 or a counterclockwise direction as viewed in Fig. 3. This disposes the deflecting member obliquely across the path of the container as it leaves the inspection zone, moving along with belt 10 upon retraction of arm 49, and the defective container is thus diverted from belt 10 into a receptacle, chute or other conveyor located alongside of belt 10.

Figs. 7 and 8 show other arrangements of the illuminating devices 93 and the light sensitive device 81 for inspecting other portions of containers. In Fig. 7 these devices are arranged to inspect the shoulder and side wall portions of containers and in Fig. 8 the bottom walls thereof.

Reference has been had throughout the foregoing specification to the inspection and classification of round containers or other round glass articles by way of example. It is within the concept and purview of the present invention to employ the same method and apparatus in the inspection of non-circular articles wherever such articles have sufficient peripheral regularity to permit such use.

For instance, in the case of inspection of the wall portion of a flat bottle, an oval bottle, a triangular bottle, or a square bottle or jar, the variation in light reflectance occasioned by the fact that the distances from the light source and the photosensitive means vary as the bottle or jar is rotated, is ordinarily not of sufficient degree to affect the photosensitive element to a point where it will operate the rejection means, and accordingly in such cases the method and apparatus of the present invention may be employed. In such cases it will also be generally desirable to arrange the illuminating and light sensitive devices with their axes more nearly in a straight line, either at a very acute angle or, when at opposite sides of the wall being scanned, at a very obtuse angle. This will enable the two devices to be aimed more nearly at a common point despite variations in wall contour.

Obviously, where the article has sharp angles or edges or other configurations which will set off the rejection means when a rejectable defect is not present, it cannot be inspected by the method and apparatus disclosed herein without special adaptation thereof.

In certain adaptations, as in the example illustrated in Fig. 7, a plurality of light sensitive components 81 are electrically connected in parallel so as to feed into the same electronic amplifier or channel, whereby unusual excitation of any of the light sensitive devices will produce a signal or impulse for operating the rejection electromagnet 100. In certain instances it is desirable to employ a separate electronic amplifier or channel for each light sensitive component. In such case the several output channels are connected in parallel to the electromagnet 100 whereby any of them may operate the same. This latter arrangement will be preferred where the several light sensitive inspection components are employed in detecting different types of defects which vary substantially in reflectance, so that one or more of the light sensitive components may require greater or less amplification than others in order to produce a satisfactory impulse for operating electromagnet 100.

We claim:

1. Automatic inspection apparatus for glass articles such as bottles and jars, said apparatus comprising means for moving a series of articles successively to an inspection station, a constantly rotating friction drive wheel at said station and having a fixed vertical axis and idler roller means operative upon arrival of an article at said station to move laterally against an article thereat and thus dispose the article laterally against said drive wheel to rotate the article substantially on its vertical axis for a predetermined period and then release the same by retrograde lateral movement, means for directing a concentrated light beam against said article at a predetermined elevation thereon, photosensitive means directed at the point of impingement of said light beam against said article, said point of light beam impingement describing a band about said article upon rotation of the latter, and means for diverting articles from said series, said diverting means being activated by said photosensitive means when the latter receives abnormal radiation from said point of light impingement, said diverting means diverting the article from which the photosensitive means receives the abnormal radiation after the article is released by the idler roller means.

2. Automatic inspection apparatus for glass articles such as bottles and jars, said apparatus comprising means for moving a series of articles successively to an inspection station, a constantly rotating friction drive wheel at said station and having a fixed vertical axis and idler roller means operative upon arrival of an article at said station to move laterally against an article thereat and thus dispose the article laterally against said drive wheel to rotate the article substantially on its vertical axis for a predetermined period and then release the same by retrograde lateral movement, photosensitive means directed at a point on said article at a predetermined elevation thereon, said point describing a band about said article upon rotation of the latter, and means for diverting articles from said series, said diverting means being activated by said photosensitive means when the latter receives abnormal radiation from said point, said diverting means diverting the article from which the photosensitive means receives the abnormal radiation after the article is released by the idler roller means.

References Cited in the file of this patent

UNITED STATES PATENTS

| | | |
|---|---|---|
| 2,132,447 | Stout | Oct. 11, 1938 |
| 2,368,796 | Ardell | Feb. 6, 1945 |
| 2,431,519 | Stoate | Nov. 25, 1947 |
| 2,481,863 | Owens | Sept. 13, 1949 |
| 2,542,090 | Lorenz | Feb. 20, 1951 |
| 2,580,275 | Brickley | Dec. 25, 1951 |
| 2,609,926 | Hartig et al. | Sept. 9, 1952 |
| 2,635,194 | Kellogg et al. | Apr. 14, 1953 |
| 2,643,767 | Baker | June 30, 1953 |
| 2,682,802 | Fedorchek et al. | July 6, 1954 |